Sept. 16, 1952　　　　　N. E. BERRY　　　　　2,610,482
APPARATUS FOR CONTROLLING THE CONCENTRATION
OF NONCONDENSABLE GASES IN AN ABSORPTION
REFRIGERATION SYSTEM
Filed April 28, 1949　　　　　　　　　　2 SHEETS—SHEET 2
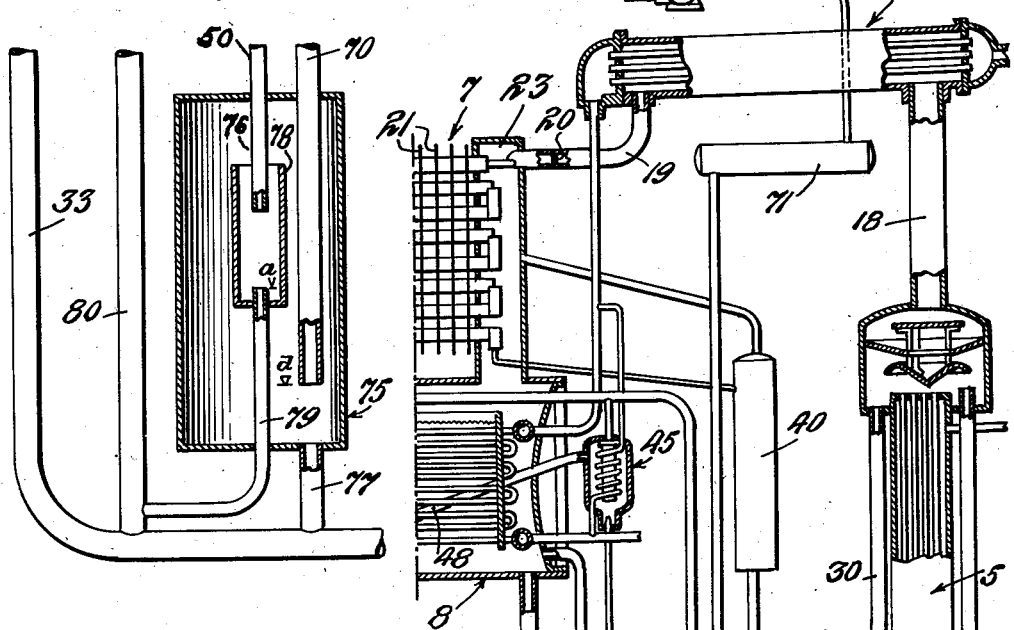
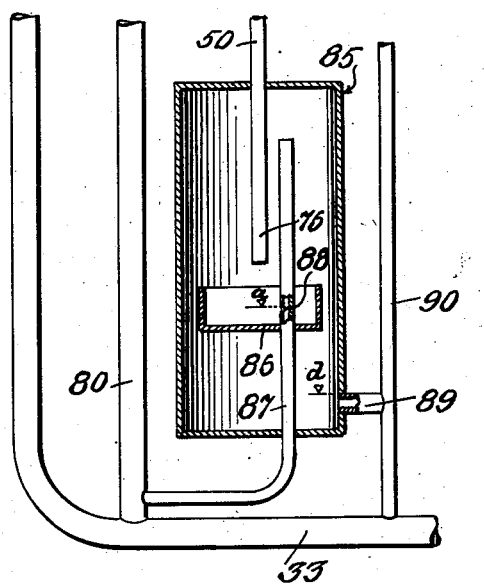
INVENTOR.
Norton E. Berry
BY
Oliver S. Titcomb
ATTORNEY Patented Sept. 16, 1952

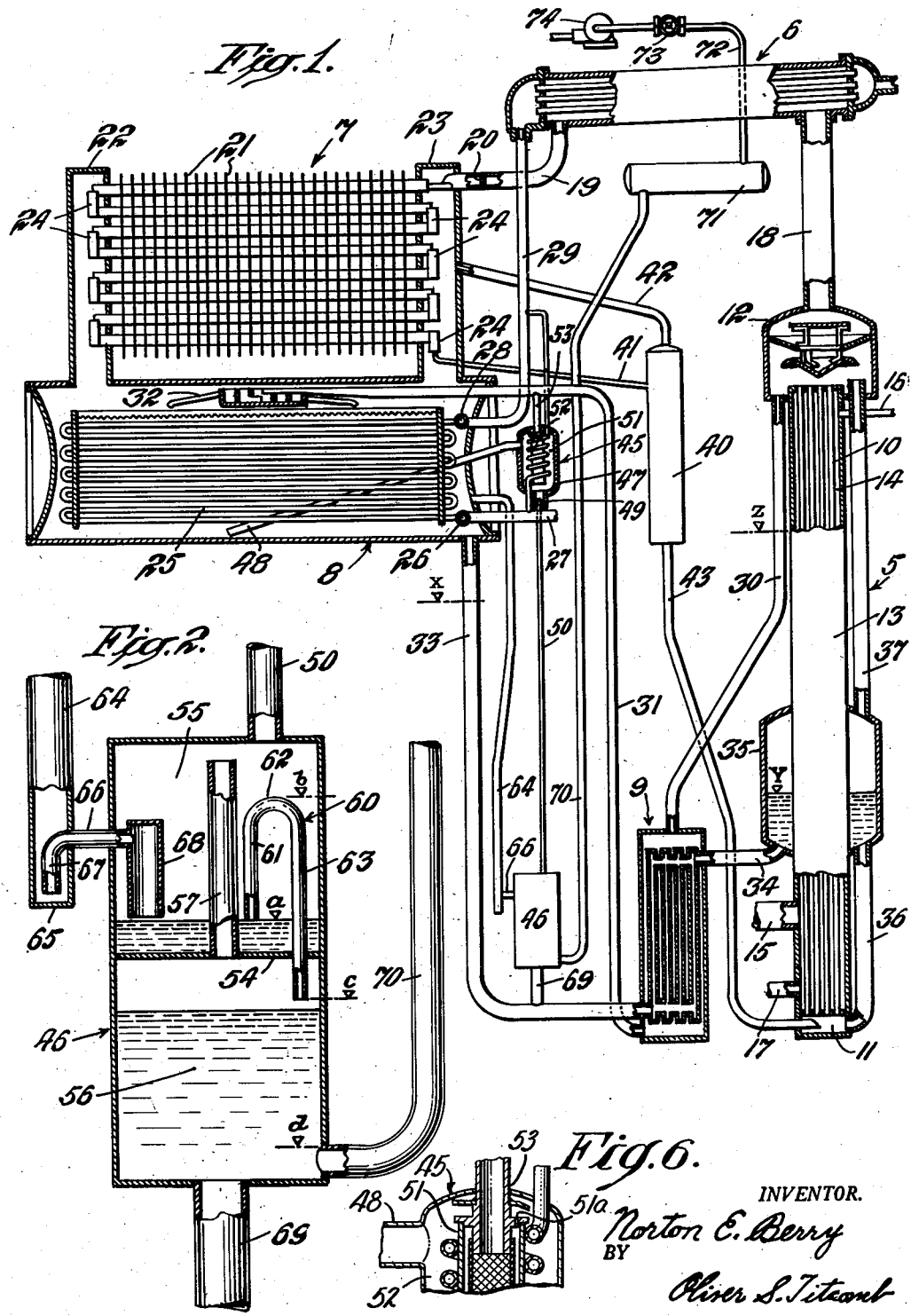

2,610,482

UNITED STATES PATENT OFFICE 2,610,482

APPARATUS FOR CONTROLLING THE CONCENTRATION OF NONCONDENSABLE GASES IN AN ABSORPTION REFRIGERATION SYSTEM

Norton E. Berry, Newburgh, Ind., assignor to Servel, Inc., New York, N. Y., a corporation of Delaware Application April 28, 1949, Serial No. 90,256

13 Claims. (Cl. 62—119)

The present invention relates to refrigeration and more particularly to controlling the concentration of non-condensable gases in a two-pressure absorption refrigeration system.

In vacuum type absorption refrigeration systems such as illustrated and described in the United States Letters Patent to Albert R. Thomas et al. No. 2,282,503 issued May 12, 1942 and entitled Refrigeration, non-condensable gases are apt to accumulate in the condenser and absorber and act as an insulating barrier preventing the transfer of heat through those parts which they blanket. By continually withdrawing the gases from the active part of the system the difficulties experienced from the accumulation of gases is avoided but it was found that when the residual amount of gas in the system is reduced below a predetermined minimum the solution superheats in the generator causing noise and irregular circulation of solution. A gas receiving vessel has been provided for storing gas during periods of operation and delivering the gas back to the system between periods of operation. Such an arrangement reduces superheating with its attendant noise and irregular circulation of solution during short cycles of operation, but during prolonged cycles of operation the residual gas in the system is reduced below the minimum amount required to prevent superheating.

One of the objects of the present invention is to provide an apparatus in an absorption refrigeration system for preventing the accumulation of excessive amounts of gas while at all times insuring the presence of a minimum amount of gas in the system.

Another object is to provide apparatus of the type indicated which continuously withdraws gas from the system and returns gas to the low pressure side at a predetermined slow rate for direct contact with solution in the absorber.

Another object is to provide apparatus of the type indicated which continuously withdraws gas from the system during working cycles and is operable after a predetermined amount of gas has been withdrawn to deliver measured quantities of gas back to the low pressure side of the system.

Still another object of the invention is to provide an apparatus of the type indicated for withdrawing gas from an active part of the system at a rate proportional to the concentration of gas therein, delivering gas to the system at a predetermined slow rate and transferring excess gas to a storage vessel after a predetermined amount has accumulated in the apparatus.

These and other objects will become apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawings:

Fig. 1 is a diagrammatic view of an absorption refrigeration system incorporating the apparatus of the present invention for controlling the concentration of non-condensable gases in the system;

Fig. 2 is an enlarged sectional view of the gas receiving vessel illustrated in Fig. 1 and showing the siphon tube and gas trap therein for delivering measured quantities of gas from the vessel to the system;

Fig. 3 is a view similar to Fig. 1 showing an apparatus of modified construction for controlling the concentration of non-condensable gases in the system;

Fig. 4 shows the modified construction as a secondary purge pump for delivering gas back to the system;

Fig. 5 is a sectional view of a secondary purge pump of modified construction; and Fig. 6 is an enlarged view of the upper portion of the purge vessel showing the orifice for delivering absorption solution at a controlled rate.

In the drawings, the apparatus of the present invention is shown applied to a two-pressure vacuum type absorption refrigeration system of the kind illustrated and described in the Thomas et al. patent referred to above. Preferably, the system utilizes water as a refrigerant and a hygroscopic salt solution such as lithium bromide as an absorbent. The refrigeration system comprises a generator 5, a condenser 6, an evaporator 7, an absorber 8 and a heat exchanger 9 interconnected to provide paths of flow for refrigerant and absorbent. The generator 5 has a plurality of upright tubes 10 connected at their lower ends to an inlet chamber 11 and at their upper ends to a separating chamber 12. The tubes 10 are enclosed in a jacket 13 to provide a heating chamber 14 therebetween. A heating medium, such as steam, is supplied to the chamber 14 from a suitable source through a conduit 15, and a vent pipe 16 maintains the steam in the chamber at atmospheric pressure. A condensate drain pipe 17 is provided adjacent the lower end of the heating chamber 14.

The separating chamber 12 of the generator 5 is connected to the condenser 6 by a conduit 18 and the condenser, in turn, is connected to the evaporator 7 by a conduit 19 having an orifice 20 therein. The orifice 20 in the conduit 19 is of such size as to pass all of the liquid refrigerant condensed in the condenser 6 and permit a limited flow of refrigerant vapor therethrough to purge non-condensable gases from the condenser, as claimed in my co-pending application for Letters Patent, Serial No. 725,000, filed January 29, 1947 and entitled Refrigeration.

Evaporator 7 comprises a plurality of substantially horizontal tubes 21 extending between headers 22 and 23. A cup 24 is provided at one end of each tube 21 in the header 22 or 23 to receive liquid refrigerant flowing from the tube above so that refrigerant flows successively through the tubes from the top to the bottom of the evaporator. The headers 22 and 23 open into the top of the absorber 8 to provide a path for the flow of refrigerant vapor from the evaporator to the absorber. The absorber 8 is in the form of a tank having a bank of vertically arranged cooling coils 25 therein to which cooling water is supplied through the header 26 and supply pipe 27 from any suitable source such as a city water main, cooling tower or the like. Each cooling coil 25 is in the form of a plurality of substantially horizontal pipes or tubes arranged one over the other with their ends connected to provide a continuous path of flow from the bottom to the top of the coil. Cooling water from the bank of cooling coils 25 is delivered through a header 28 and conduit 29 to the inlet of condenser 6.

Absorption solution weak in refrigerant or, in other words, concentrated salt solution flows by gravity from separating chamber 12 to the top of the absorber 8 in a path of flow including a conduit 30, heat exchanger 9, conduit 31 and liquid distributor 32. The liquid distributor 32 delivers absorption solution onto the uppermost tube of each coil 25 in a series of spaced drops which flow over the surface of the tube in a thin film and then drop and spread over the surface of the next lowermost tube successively from the top to the bottom of each coil. This division of the absorption solution provides a large area of solution for contact with refrigerant vapor and also provides for the transfer of the heat of absorption to the cooling water throughout the entire surface area of the coils.

Absorption solution strong in refrigerant or, in other words, dilute salt solution flows by gravity from the bottom of the absorber 8 to the inlet chamber 11 of the generator 5 in a path of flow including a conduit 33, heat exchanger 9, conduit 34, reservoir vessel 35 and conduit 36. The reservoir vessel 35 is positioned above the base of the generator 5 to continuously supply absorption solution to the inlet chamber 11 and maintain a liquid column in conduit 36 to provide a reaction head on the solution in the generator tubes 10. To conserve space the reservoir vessel 35 is of annular form and surrounds the jacket 13 of the generator 5. Preferably, the vessel 35 is of such dimensions as to receive varying amounts of solution without materially affecting the liquid level therein to maintain a substantially constant reaction head, the top of the vessel 35 being connected to the separating chamber 12 by a conduit 37 to equalize the pressure therebetween.

The generator 5 and condenser 6 operate at a pressure corresponding substantially to the vapor pressure of the refrigerant at its condensing temperature and the evaporator 7 and absorber 8 operate at a lower pressure corresponding to the vapor pressure of the refrigerant in the absorption solution at the temperature and concentration of the solution in the absorber. The difference in pressures in the condenser 6 and evaporator 7 is maintained by the orifice 20 and the difference in pressures in the absorber 8 and generator 5 is maintained by liquid columns in the conduits 31 and 33. The liquid level in the conduit 33 is indicated by the reference character X, the liquid level in the reservoir vessel 35 is indicated by the reference character Y and the liquid level in the conduit 30 connected to the conduit 31 through the heat exchanger 9 is indicated by the reference character Z.

A concentration control vessel 40 of the type claimed in United States Letters Patent of Lowell McNeely No. 2,465,904 issued March 29, 1949 is connected to the lowermost cup 24 in the evaporator 7 by a conduit 41 and to the header 23 of the evaporator by a conduit 42. The lower end of the concentration control vessel 40 is connected to the inlet chamber 11 of the generator 5 by a conduit 43.

In such a system it has been found that non-condensable gases are apt to occur which if allowed to accumulate in the condenser 6 and absorber 8 will reduce the transfer of heat in the elements. On the other hand, it has been found that if all of the non-condensable gases are withdrawn from the system, the boiling of the solution in the generator tubes 10 is erratic which produces undesirable noise and irregular lifting of absorption solution. It is believed that when gas is present in the absorber a small quantity is trapped in solution as the latter flows into conduit 33 which provides a nucleus to promote boiling in the generator but when no gas is available the solution superheats in the generator causing the noise and irregular pumping.

In accordance with the present invention apparatus is provided for continuously withdrawing non-condensable gas from the low pressure side of the system to prevent its accumulation therein and delivering at least a part of such withdrawn gas back to the low pressure side of the system at a slow rate to insure the presence of a minimum amount of gas in the absorber at all times. The apparatus comprises a purge device 45 for continuously withdrawing gases from the low pressure side, a vessel 46 for receiving liquid and gas from the purge device and means in the vessel for delivering gas from the vessel back to the low pressure side of the system.

The purge device 45 is generally similar to that illustrated and described in United States Letters Patent to C. S. Roswell, No. 2,384,861, issued September 18, 1945 and consists of a vessel 47 connected to the interior of the main absorber 8 by a suction tube 48. The bottom of the vessel 47 is formed to provide a small cup or sump 49 into which the upper end of a vertical fall tube 50 projects. Within the vessel 47 is a cylindrical chamber 51 having a cooling coil 52 around its periphery. The interior of the chamber 51 is connected to the conduit 31 for delivering concentrated salt solution to the absorber 8 by means of a pipe 53 and the ends of the cooling coil 52 are connected to the conduits 27 and 29, respectively, to cause cooling medium to flow therethrough. The top of the chamber 51 is provided with a measuring orifice 51a, see Fig. 6, for delivering absorption solution to the interior of the vessel 47 at a predetermined fixed rate which flows over the cooling coil 52. The fall tube 50 has a relatively small cross-sectional area so that liquid accumulating in cup 49 will alternately bridge and open the tube as it flows into the latter and trap gas between the adjacent slugs of liquid.

Gas receiving vessel 46 is connected to the lower end of the fall tube 50. A septum plate 54, see Fig. 2, divides the vessel 46 into upper and lower chambers 55 and 56, respectively, and a standpipe 57 extends upwardly from the plate into the upper chamber to provide a path of flow for gas between the chambers. Mounted in the vessel 46 is an inverted U-shaped siphon tube 60 having the open end of one leg 61 at the level $a$ in the upper chamber 55, the reversed bend 62 at a higher level $b$ in the upper chamber and the opposite leg 63 extending through the septum plate to a level $c$ in the lower chamber 56. Upper chamber 55 is connected to the low pressure side of the system by a conduit 64 and in the illustrated embodiment the conduit is connected to the side of the absorber 8. The conduit 64 comprises a pipe having a lower closed end 65, see Fig. 2, and a smaller tube 66 providing a gas trap between the pipe and chamber 55 of the vessel 46. The tube 66 has a depending portion 67 in the lower end 65 of the pipe and a horizontal portion projecting through the side wall of the upper chamber 55 of the vessel 46. Connected to the end of the tube 66 in the chamber 55 is an inverted cup 68 having its open end positioned slightly above the level $a$ at the lower end of the leg 61 of the siphon tube 60. The cup 68 constitutes a measuring device for trapping a predetermined quantity of gas and together with the depending leg 67 of the tube 66 provides a gas trap in the conduit 64.

The bottom of the lower chamber 56 is connected by a conduit 69 to the conduit 33 for delivering solution from the absorber 8 to the generator 5. A conduit 70 has one end connected to the side of the lower chamber 56 at the level $d$ and its opposite end connected to a gas storage vessel 71. A suitable means is provided for emptying the storage vessel 71 from time to time comprising a conduit 72, valve 73 and pump 74. One form of the invention having now been described in detail, the mode of operation is explained as follows.

When heating medium is supplied to the chamber 14 of the generator 5 its heat is transmitted through the tubes 10 to expel refrigerant vapor, water, from absorption solution, lithium bromide solution, and raise the solution in the tubes by vapor lift action. The refrigerant vapor is separated from the absorption solution in the separating chamber 12 and flows through the conduit 13 into the condenser 6 where it is liquefied by transferring its heat of vaporization through the tubes of the cooling medium flowing through the tubes of the condenser. Liquefied refrigerant then flows from the condenser 6 through the conduit 19 and orifice 20 to the evaporator 7.

Simultaneously, absorption solution from which the refrigerant vapor has been expelled flows by gravity through the conduit 30, heat exchanger 9 and conduit 31 to the liquid distributing device 32 where it is distributed for flow over the bank of cooling coils 25. The relatively cool absorption solution absorbs refrigerant vapor which reduces the vapor pressure in the absorber 8 and evaporator 7. The liquid refrigerant in the tubes 21 of the evaporator 7 then evaporates at the lower pressure and temperature to produce a refrigerating effect. Diluted absorption solution flows by gravity from absorber 8 through the conduit 33, liquid heat exchanger 9, conduit 34, reservoir vessel 35 and conduit 36 back to the inlet chamber 11 of the generator 5 to complete the cycle of operation.

Any liquid refrigerant overflowing from the lowermost tube 21 of the evaporator 7 enters the concentration control vessel 40 where it is stored in a pressure balancing liquid column therein to increase the concentration of the absorption solution delivered to the absorber 8 and thereby reduce the pressure and temperature of the evaporator 7. Any non-condensable gases occurring in the system are delivered to the absorber 8. Gases in the generator 5 flow with refrigerant vapor to the condenser 6 and gases in the condenser 6 flow through the orifice 20 to the evaporator 7. Gases in the evaporator 7 are swept with the refrigerant vapor into the absorber 8 where they accumulate at the center and bottom of the absorber.

Concentrated absorption solution flows from conduit 31 into the chamber 51 of purge device 45 through pipe 53 and is delivered through a measuring orifice in the chamber at a predetermined fixed rate for flow over the cooling coil 52. Thus, the vessel 47 of the purging device 45 constitutes an auxiliary absorber which absorbs refrigerant vapor therein and creates relative vacuum with respect to the main absorber 8 to draw in non-condensable gases through the suction tube 48. The absorption solution accumulates in the sump 49 where it overflows intermittently into the fall tube 50 to form successive slugs of liquid therein with bubbles of non-condensable gas trapped therebetween. The column of liquid and gas in the fall tube 50 balances the difference in pressure between the vessels 46 and 47 and the addition of liquid at the top of the column in fall tube causes a corresponding amount of liquid to be delivered from the fall tube 50 into the upper chamber 55 of the receiving vessel 46.

At the beginning of a period of operation the gas receiving vessel 46 will be filled with absorption solution standing at the level Y and as the pressure in the absorber decreases columns of solution will rise to the level X in conduits 33 and 50 to balance the difference in pressure between the generator and absorber. As solution is delivered from absorber 8 into conduit 33 it will fall to level X and displace a corresponding amount of solution which flows into reservoir vessel 35. Also solution delivered from the auxiliary absorber vessel 47 through fall tube 50 will displace a corresponding amount of solution from vessel 46 which flows through conduit 69 to conduit 33 and into reservoir vessel 35 but as the solution in fall tube 50 has gas trapped therein it will be less dense and stand at a level higher than the level X in conduit 33 to balance the difference in pressure. Solution delivered to the vessel 46 from the fall tube 50 will flow through the standpipe 57 and siphon tube 60 to lower chamber 56 then through conduits 69 and 33 toward the generator 5 and the non-condensable gases will accumulate in the top of chamber 55. This operation will continue for a period of time until the accumulated gases fill the chamber 55 to the level $a$ at which time gas will displace liquid in the cup 68 and will also break the siphon in tube 60. The absorption liquid then will accumulate in the upper chamber 55 and rise from the level $a$ to the level $b$ during which time the gas in chamber 55 will flow through standpipe 57 into chamber 56 and depress the liquid level therein. As the liquid level rises in the chamber 55 the gas trapped in the cup 68 is forced through tube 66 into the lower end of the pipe in conduit 64 and bubbles up through the liquid column therein and into the absorber 8 at the side thereof. When the solution rises to the level $b$ in chamber 55 the siphon tube 60 operates to drain the liquid from the upper chamber into the lower chamber 56. As the liquid level falls from the level $b$ to the level $a$ in the upper chamber 55 the bottom of the inverted cup 68 is again uncovered and gas enters the cup. Thus, the purge device 45 operates to continuously withdraw non-condensable gases from the low pressure side of the system and the apparatus in the gas receiving vessel 46 operates after a period of time to return gases to the low pressure side of the system at a predetermined rate.

At the end of a period of operation of the system, gases in the vessel 46 will flow back through the fall tube 50, vessel 47 and suction tube 48 into the absorber to provide a quantity of gas to be trapped in solution at the beginning of the next period of operation and the withdrawal from and return of gas to the absorber 8 is repeated during each cycle of operation. As the liquid in chamber 55 rises from the level $a$ to the level $b$ the gas therein flows through standpipe 57 and depresses the liquid level in chamber 56 and when a sufficient amount of gas has accumulated in vessel 46 to depress the liquid to level $d$, surplus gas will flow into conduit 70, bubble through the liquid therein and enter storage vessel 71. After operation of the refrigeration system for a period of time an amount of gas corresponding to the volume of the upper chamber 55 above the level $b$ plus a volume in the lower chamber 56 down to level $d$ will be available for delivery to the refrigeration system. In this manner accumulation of excessive amounts of gas in the absorber 8 is prevented while the presence of a minimum amount of gas in the absorber is assured to prevent superheating of solution in the generator with its attendant noise and irregular circulation.

Figs. 3 and 4 of the drawings illustrate an apparatus of modified construction for preventing the accumulation of non-condensable gas in the system while at all times maintaining a minimum quantity of gas in the system to prevent superheating of solution in the generator. The refrigeration system illustrated in Fig. 3 is identical with that shown in Fig. 1 so that the descripion will be limited to the apparatus for controlling the concentration of non-condensable gases in the system. This apparatus comprises a gas receiving vessel 75 into which the lower end 76 of the fall tube 50 of the purge device 45 projects. The bottom of the vessel 75 is connected to solution conduit 33 by a conduit 77. A cup 78 in the vessel 75 surrounds the depending end 76 of the fall tube 50 and an auxiliary fall tube 79 extends from a level $a$ at the interior of the cup through the bottom of the vessel and is connected to the side of an upright conduit 80 extending between the conduit 33 and the side of the absorber 8. In the modified construction the lower end of gas overflow pipe 70 projects downwardly into the vessel 75 to a level $d$ below the cup 78. The cup 78 and auxiliary fall tube 79 constitute a secondary purge pump for withdrawing gas from the vessel at a rate which varies with the height of the liquid in the vessel between the level $a$ at the upper end of the auxiliary fall tube 79 and the level $d$ at the lower end of the gas overflow pipe 70.

The refrigeration system operates generally in the same way as explained with respect to the apparatus illustrated in Figs. 1 and 2. At the beginning of a period of operation the vessel 75 will be filled with solution to some level slightly above the end of fall tube 76 with gas trapped in the top of the vessel above the liquid level. Any non-condensable gases delivered by the purge device 45 will accumulate at the top of the vessel 75 and displace liquid which flows therefrom through conduit 77 until the liquid falls to the level $a$. At the beginning of a period of operation the concentration of gases in the absorber 8 will be high so that a relatively large amount of gas will be trapped in solution to insure boiling in the generator 5 without superheat. Also due to the high concentration of gas in the absorber 8 the purge device 45 will withdraw the gas at a relatively high rate but the rate of pumping will decrease proportionately with the concentration of gas.

When the liquid in vessel 75 is depressed to some level below the top of the auxiliary fall tube 79 the flow of liquid from the primary purge pump 45 through the auxiliary fall tube 79 will start pumping gas from the vessel 75 and deliver it through the upright conduit 80 back to the absorber 8. Pumping is caused by liquid in cup 78 rising around the sides of the auxiliary fall tube 79 until the height of the meniscus is greater than the force of adhesion at which time the liquid bridges and seals the open end of the tube and runs into the latter. When the liquid runs into the tube, it adds weight to the column causing flow in the tube until the liquid in the cup falls to some level below $a$, due to the cohesion or surface tension of the liquid, at which the liquid film across the top of the tube breaks. The liquid which last entered the tube will fall to some level between $a$ and the liquid level in vessel 75 depending upon the density of the column and, due to the break in the liquid seal, gas will enter the end of the tube from the fluid level therein to the level $a$. When the liquid again rises in cup 78 to a height to bridge the end of the tube it traps the gas between it and the slug of liquid below, the tube being of sufficiently small cross-sectional area so as to prevent gas from freely bubbling through the liquid. The rate of pumping of gas by fall tube 79 is a function of the difference in height of the liquid columns in the fall tube 79 and vessel 75. This is because the column of fluid in fall tube 79 between level $a$ and the horizontal portion of conduit 33 can contain increasing amounts of gas and balance the liquid column in vessel 75 as the liquid level in the latter falls. With a greater difference in the height of the liquid columns, a greater amount of gas may be trapped in the solution in fall tube 79 to produce a column of less density in balance with the column of liquid in vessel 75 and conduit 77 above the bottom of the fall tube. Therefore, as the amount of gas in the vessel 75 increases the liquid level in vessel 75 is depressed and the rate of pumping by the auxiliary purge pump increases until a level is reached at which both purge pumps deliver gas at the same rate. At such time a condition of equilibrium is reached when the concentration of gas in the absorber is at least sufficient to prevent superheat. Any additional gas will increase the concentration of gas in the absorber 8 which, in turn, will increase the rate of pumping by the primary purge device 45 so that more gas will accumulate in the vessel 75. This accumulation will continue until the liquid in vessel 75 is depressed to level d after which gas will be discharged through the conduit 70 to the storage vessel 71 as fast as it accumulates in the receiving vessel. Thus, the apparatus operates after a predetermined period of time to deliver non-condensable gas to the absorber 8 at a predetermined slow rate to insure the presence of a minimum amount of gas in the absorber at all times.

Fig. 5 discloses a secondary purge pump of modified construction which is adapted for use where the quantity of solution delivered by the primary purge device 45 is variable. The construction illustrated in Fig. 5 comprises a gas receiving vessel 85 having a relatively shallow cup 86 therein, located directly below the end 76 of the fall tube 50. An auxiliary fall tube 87 has its lower end connected to the riser conduit 80 as in Fig. 4 but its other end extends upwardly through the bottom of the vessel 85 and cup 86 and terminates above the top of the cup. An orifice 88 is provided in the side of the auxiliary fall tube 87 which is located at level $a$ between the top and bottom of the cup 86 and of a size to pass liquid at a predetermined rate. A conduit 89 has one end connected to the side of the vessel 85 at level $d$ and its opposite end connected to the side of an upright conduit 90 extending between the solution conduit 33 and gas storage vessel 71.

With the arrangement illustrated in Fig. 5 solution flowing from the primary purge device 45 enters the cup 86 and flows through orifice 88 into the auxiliary fall tube 87 at a fixed rate. Flow of solution through the auxiliary fall tube 87 will trap gas entering through its open top and carry it to the conduit 80 where it bubbles through solution and is delivered back to the absorber 8. If the amount of solution delivered from the primary purge device 45 increases it will merely overflow from the cup 86 into vessel 85 without materially changing the rate of flow through the orifice 88 and fall tube 87. Gas accumulating in vessel 85 displaces solution which flows therefrom through conduits 89 and 90 to conduit 33 and when solution is depressed to level $d$ gas will escape through said conduits, rise through the column of solution in conduit 90 and enter storage vessel 71.

It will now be observed that the present invention provides apparatus in a two-pressure absorption refrigeration system for controlling the concentration of non-condensable gases in the system. It will still further be observed that the present invention provides an apparatus for preventing the accumulation of excessive amounts of gas in the system while at all times insuring the presence of a minimum amount of gas therein. It will still further be observed that the present invention provides an apparatus operable after a predetermined quantity of gas has been withdrawn from the system to deliver measured quantities of the gas back to the low pressure side of the system at a predetermined slow rate for entrapment into solution and deliver excess gas to a storage vessel.

While three embodiments of the invention are herein illustrated and described, it will be understood that further modifications may be made in the construction and arrangement of elements without departing from the spirit or scope of the invention. Therefore, without limitation in this respect, the invention is defined by the following claims.

1. In a vacuum type absorption refrigeration system having a high pressure side and a low pressure side, apparatus for controlling the concentration of non-condensable gas in the system comprising a vessel for receiving non-condensable gas, a purge device for withdrawing non-condensable gas from the low pressure side and delivering it to the vessel to prevent the accumulation of excessive amounts of gas in the system, and conduit means connecting the receiving vessel and low pressure side of the system and constructed to deliver gas from the receiving vessel back to the low pressure side of the system at a slow rate to insure the presence of a minimum amount of gas in the system.

2. In a vacuum type absorption refrigeration system having a generator and condenser operable at one pressure and an evaporator and absorber operable at a lower pressure with means interconnecting the elements to provide paths of flow for refrigerant and absorbent and maintain the difference in pressure, apparatus for controlling the concentration of non-condensable gas in the system comprising a vessel for receiving non-condensable gas, a purge device connecting to withdraw non-condensable gas from the absorber and deliver it to the vessel to prevent the accumulation of an excessive amount of gas in the absorber, and conduit means directly connecting the receiving vessel and absorber and constructed to operate by the flow of fluid in the system to deliver gas from the receiving vessel to the absorber at a slow rate to insure the presence of a minimum amount of gas in the absorber.

3. In a vacuum type absorption refrigeration system having a high pressure side and a low pressure side, apparatus for controlling the concentration of non-condensable gas in the system comprising a gas receiving vessel, a purge device utilizing the flow of liquid therethrough for withdrawing non-condensable gas from the low pressure side and delivering it to the vessel to prevent the accumulation of excessive amounts of gas in the system, means utilizing the liquid from the purge device for delivering measured quantities of gas from the vessel back to the low pressure side to insure the presence of a minimum amount of gas in the system, said last named means being so constructed and arranged as to deliver gas at a rate proportional to the rate at which liquid is delivered from the purge device, and means for controlling the flow of liquid through the purge device to maintain the flow of gas to the low pressure side at a predetermined fixed rate.

4. In a vacuum type absorption refrigeration system having a plurality of elements including an absorber interconnected to provide paths of flow for refrigerant and absorbent and deliver non-condensable gas to the absorber, apparatus for controlling the concentration of non-condensable gas in the system comprising a gas receiving vessel, a purge device connected to continuously withdraw non-condensable gas from the absorber and deliver it to the gas receiving vessel, means for delivering gas at a predetermined fixed rate from the receiving vessel to the absorber to insure the presence of a minimum amount of gas in the absorber, a gas storage vessel, and means for transferring excess gas to the storage vessel after a predetermined amount has accumulated in the receiving vessel.

5. In an absorption refrigeration system, apparatus for controlling the concentration of non-condensable gas in the system comprising a purge device utilizing the flow of liquid therethrough for withdrawing non-condensable gas from the system, a vessel connected to receive liquid and gas from the purge device, a siphon tube in the vessel for intermittently draining liquid therefrom to alternately raise and lower the liquid level therein, and conduit means connecting the receiving vessel and low pressure side of the system and constructed to deliver predetermined quantities of gas from the vessel back into the system between the fall and rise of the liquid level in the vessel during each cycle of operation of the siphon.

6. In a vacuum type absorption refrigeration system having a high pressure side and a low pressure side, apparatus for controlling the concentration of non-condensable gas in the system comprising a purge device utilizing the flow of liquid therethrough for withdrawing non-condensable gas from the system, a vessel connected to receive liquid and gas from the purge device, a siphon tube in the vessel for intermittently draining liquid therefrom to alternately raise and lower the liquid level therein, and conduit means connecting the receiving vessel and low pressure side of the system including an inverted cup in the vessel for trapping a measured quantity of gas and delivering the gas from the cup back to the system when the liquid level falls below the bottom of the cup and then rises above the cup during each siphoning operation.

7. In a vacuum type absorption refrigeration system having a high pressure side and a low pressure side, apparatus for controlling the concentration of non-condensable gas in the system comprising a purge device for withdrawing non-condensable gas from the system, a vessel connected to receive liquid and gas from the purge device, a wall in the vessel separating it into upper and lower chambers with a standpipe extending upwardly from the wall into the upper chamber for permitting the flow of gas between the chambers, a siphon tube connecting the upper and lower chambers for intermittently delivering liquid from the upper chamber to the lower chamber, and a conduit connected between the upper chamber and low pressure side of the system including an inverted cup in the chamber for trapping measured quantities of gas and delivering it from the cup back to the system when the liquid level rises in the upper chamber.

8. In an absorption refrigeration system, apparatus for controlling the concentration of non-condensable gas in the system comprising a gas transfer device utilizing the flow of liquid therethrough for withdrawing gas from the system at a rate varying with the concentration of gas therein, a vessel connected to receive liquid and gas from the gas transfer device, said gas displacing liquid in said vessel, a second gas transfer device in said vessel for withdrawing gas therefrom at a rate varying with the height of the liquid level in the vessel, and a conduit connecting the second gas transfer device to the low pressure side of the system for delivering gas from the second gas transfer device back into the system.

9. In a vacuum type absorption refrigeration system having a high pressure side and a low pressure side, apparatus for controlling the concentration of non-condensable gas in the system comprising a primary purge device utilizing the flow of liquid therethrough for withdrawing gas from the system, a vessel connected to receive liquid and gas from the primary purge device, a drain conduit through which liquid flows from the vessel back into the system, a secondary purge device in the vessel having a cup underlying the outlet from the primary purge device and a conduit projecting through the bottom of the cup and connected to the system whereby the secondary purge device withdraws gas from the vessel and delivers it back into the system at a rate varying with the height of the liquid level in the vessel to maintain a predetermined minimum amount of gas in the system at all times.

10. In a vacuum type absorption refrigeration system having a high pressure side and a low pressure side, apparatus for controlling the concentration of non-condensable gas in the system comprising a primary purge device utilizing the flow of liquid therethrough for withdrawing gas from the system, a vessel connected to receive liquid and gas from the primary purge device, a drain conduit through which displaced liquid flows from the bottom of the vessel back into the system, a secondary purge device in the vessel having a cup underlying the outlet from the primary purge device and a conduit projecting through the bottom of the cup and connected to the system, and a storage tank having a conduit extending into the vessel with its lower end at a level below the bottom of the cup.

11. In an absorption refrigeration system, apparatus for controlling the concentration of non-condensable gas in the system comprising a primary gas transfer device utilizing the flow of liquid therethrough for withdrawing gas from the system, a vessel connected to receive liquid and gas from the primary gas transfer device, and a secondary gas transfer device in the vessel having a fall tube with one end connected to the active part of the system and its opposite end extending through the bottom of the vessel and upwardly above the liquid level therein, said tube having an orifice in the side thereof to deliver liquid at a predetermined fixed rate therethrough whereby the flow of liquid through the orifice traps gas entering through the open end of the fall tube and delivers the gas back to the system.

12. In an absorption refrigeration system, apparatus for controlling the concentration of non-condensable gas in the system comprising a primary purge device utilizing the flow of liquid therethrough for withdrawing gas from the system, a vessel connected to receive liquid and gas from the primary purge device, a cup in the vessel, a fall tube having its lower end connected to the system and extending upwardly through the bottom of the vessel and cup with its open end above the liquid level therein, said fall tube having an orifice in the side thereof between the top and bottom of the cup whereby the flow of liquid through the orifice traps gas entering the open end of the tube and delivers the gas back into the system.

13. In a vacuum type absorption refrigeration system having a high pressure side and a low pressure side, apparatus for controlling the concentration of non-condensable gas in the system comprising a gas receiving vessel, a purge device for withdrawing non-condensable gas from the low pressure side of the system and delivering it to the vessel, and a conduit directly connecting the vessel to the low pressure side of the system and having means responsive to the accumulation of a predetermined amount of gas in the vessel for delivering gas from the receiving vessel back to the low pressure side of the system to insure the presence of a minimum amount of gas therein.

NORTON E. BERRY.

REFERENCES CITED

The following references are of record in the file of this patent:

UNITED STATES PATENTS

| Number | Name | Date |
|---|---|---|
| 942,367 | Dyer | Dec. 7, 1909 |
| 2,353,859 | Thomas | July 18, 1944 |
| 2,367,708 | Anderson | Jan. 23, 1945 |
| 2,426,069 | Thomas | Aug. 19, 1947 |